Dec. 22, 1953   N. F. CORNELIUS   2,663,122
PRESSURE REGULATING VALVE
Filed Sept. 29, 1949
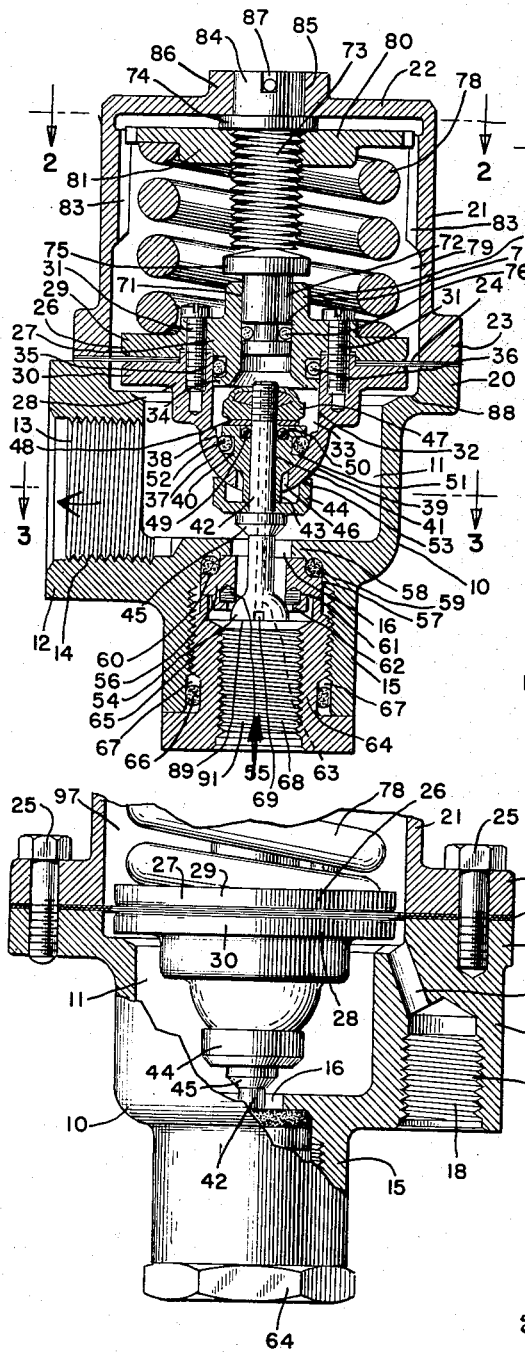
FIG. 1
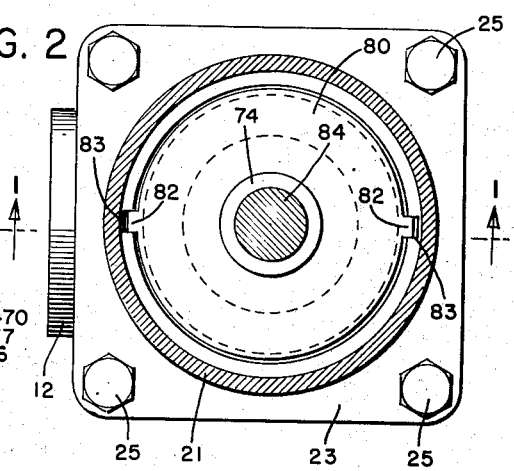
FIG. 2
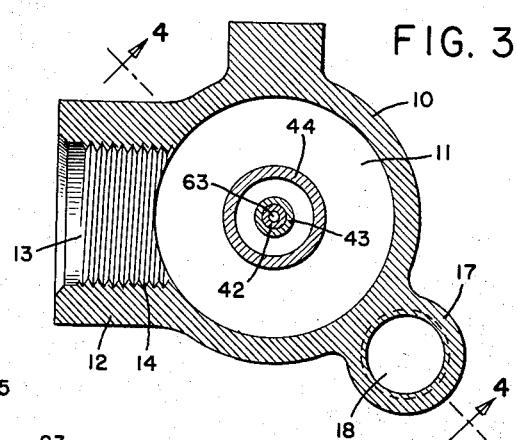
FIG. 3
FIG. 4
Inventor
NELSON F. CORNELIUS
By Caswell & Lagaard
ATTORNEYS Patented Dec. 22, 1953

2,663,122

UNITED STATES PATENT OFFICE 2,663,122

PRESSURE REGULATING VALVE

Nelson F. Cornelius, Anoka, Minn.

Application September 29, 1949, Serial No. 118,517

8 Claims. (Cl. 50—23)

The invention herein disclosed relates to pressure regulating valves and particularly to the type utilizing a valve body having a pressure chamber therein subject to the regulated pressure and further having a diaphragm partly enclosing said chamber, and further utilizing a valve mechanism including a valve passageway communicating with said chamber and with the source of fluid whose pressure is to be regulated, said passageway having a valve seat encircling the same and adapted to be closed by means of a valve head operated by said diaphragm said diaphragm being urged by a spring to move said valve head into open position.

An object of the instant invention resides in providing a pressure regulating valve of the type above described in which the pressure of the fluid regulated is maintained constant within close limits.

Another object of the invention resides in providing in the regulating valve a balancing device for balancing out the pressure on the valve head produced by the pressure of the fluid to be regulated.

A still further object of the invention resides in providing a pressure regulating valve in which chatter of the valve mechanism is greatly reduced.

An object of the invention resides in providing a pressure regulating valve in which variation in pressure produced by the spring on the diaphragm at different localities about the rim of the diaphragm does not affect the operation of the valve mechanism.

Another object of the invention resides in providing an aligning device for aligning the valve head with the valve seat to procure proper seating of the valve head upon the valve seat.

A still further object of the invention resides in providing a pressure regulating valve in which the pressure of the valve head on the valve seat after closing of the valve mechanism is unaffected by increase in the pressure of the fluid to be regulated.

In carrying out the various objects of my invention I provide a valve operating device mounted on the diaphragm and which is formed with a bore serving as a cylinder. A piston fixed with respect to the valve body is mounted in said cylinder and relative motion between the valve operating member and piston is procured upon operation of the diaphragm. The said cylinder communicates with a chamber within the valve operating device. Associated with the valve operating device is a valve stem carrying the valve head, which valve stem has a passageway therein communicating with the chamber within the valve operating device and with the inlet to the pressure regulating valve. The diameter of said piston and cylinder is substantially equal to the diameter of the circle of contact of the valve head with the valve seat so that the pressure on the valve head tending to urge the valve operating member in one direction is offset by the pressure within said chamber tending to urge the valve operating member in the opposite direction. The valve operating device is formed with a socket and the valve stem has mounted on it a ball which has limited swinging movement in the socket whereby the valve head may be maintained in alignment with the valve seat and leakage past the valve is prevented. The piston in the valve operating device is formed with a groove in which is disposed a rubber ring cooperating with the wall of the cylinder to reduce leakage and to produce friction between the parts, which has the effect of reducing vibration and oscillation in the pressure regulating valve.

In the drawings:

Fig. 1 is an elevational sectional view of an embodiment of the invention showing the parts positioned as in actual use and taken on line 1—1 of Fig. 2.

Fig. 2 is a plan sectional view taken on line 2—2 of Fig. 1.

Fig. 3 is another plan sectional view taken on line 3—3 of Fig. 1.

Fig. 4 is a fragmentary elevational sectional view taken on line 4—4 of Fig. 3.

The invention comprises a valve body 10 constructed to form a valve chamber 11 within the same. The said valve body has a laterally extending boss 12 which is formed with a passageway 13 through the same. The said boss is formed with threads 14 and to which a pipe or fitting may be screwed and adapted to communicate with the passageway 13. The passageway 13 communicates with the chamber 11. The passageway 13 forms the outlet for the device. Extending downwardly from the body 10 is a boss 15 which has a passageway 16 in the same and which also communicates with the chamber 11. On the body 10 is also formed another boss 17 which has a passageway 18 in it and which communicates with the chamber 11. This boss is formed with threads 19 and into which a pressure gauge or other apparatus not shown in the drawings may be screwed.

The chamber 11 is open at the top and is formed with a flange 20 extending about the same. Overlying the body 10 is a cover 21 which has a top 22 and which is open at the bottom.

The lowermost portion of this cover has a flange 23 which overlies the flange 20. The interior of the cover 21 is designated by the reference numeral 79. The diaphragm of the pressure regulating valve is indicated by the reference numeral 24 and lies between the two flanges 20 and 23. Cap screws 25 extend through the flange 23 and are threaded into the flange 20 and serve to clamp the parts together and to form a fluid-tight connection between the diaphragm 24 and the body 10.

Attached to the diaphragm 24 is a valve operating device 26 which consists of an upper valve operating member 27 and a lower valve operating member 28. The parts 27 and 28 are formed with discs 29 and 30 which overlie the diaphragm 24 and which are clamped together by means of screws 31 which pass through the disc 29 and are screwed into the disc 30. The lower valve operating member 28 is formed with a cylindrical bore 32 which provides a chamber 33 within the same. The valve operating member 27 has a part 34 which extends into the bore 32 and which is formed with a groove 35. In this groove is disposed a ring 36 constructed of some flexible elastic material such as rubber or the like. This ring engages the top of the groove 35 and also the wall 32 and forms a fluid-tight connection between the two valve operating members 27 and 28.

The valve operating member 28 is formed at its lower end with a wall 37 having an inner spherical surface 38 and an outer spherical surface 39 concentric with the surface 38. The surface 38 forms a socket in which is disposed a fragmentary ball 40. This ball has a bore 41 in the same and through which the end of a valve stem 42 extends. The ball 40 has a sleeve 43 on the end of the same which extends down to and engages a washer 44 encircling the stem 42. The stem 42 and sleeve 43 are movable within an opening 46 in the wall 37. This washer butts up against a shoulder 45 on the valve stem 42. A nut 47 is screwed upon the end of the stem 42 and bears against a washer 48. This washer presses against a flexible ring 49 which is disposed within a groove 50 encircling the valve stem 42. Pressure on the ring 49 forces the ring against the ball 40 and the stem 42 and provides a fluid-tight connection therewith. The ball 40 has a groove 51 in the same in which is disposed a flexible ring 52. This ring is similar to the rings 36 and 49 and forms a fluid-tight connection between the ball 40 and the socket formed by the surface 38 of the valve operating member 28. The washer 44 has a surface 53 which bears against the surface 39 of the valve operating member 28 and rides upon the same. By means of this construction the valve stem 42 may swing a limited amount defined by the opening 46 and at the same time leakage between the valve stem and the valve operating member 28 is prevented.

The valve mechanism of the invention is indicated by the reference numeral 89 and is constructed as follows: On the end of the valve stem 42 is formed a valve head 54. This valve head is adapted to engage a valve seat 55 constructed of some relatively hard plastic material such as is now known in the art as "nylon." The said valve seat is in the form of an annular ring which is mounted in a holder 56. The said holder slides in a bore 57 in the boss 15 and is seated at its end against a flange 58 in the body 10 and through which the passageway 16 extends. A flexible ring 59 is mounted in a groove 60 in the holder 56 forms a fluid-tight connection between the valve seat 55 and the body 10. The valve seat 55 is disposed in a groove 61 in the holder 56 and is held in place therein by means of a lip 62 which is turned back over the said ring. The head 54 and valve stem 42 are formed with a longitudinally extending passageway 63 which communicates with the chamber 33 and also with the inlet to the pressure regulating valve. The holder 56 is held in place by means of a nut 64 which is externally threaded to screw into threads 65 formed in the boss 15. The said nut engages the holder 56 and urges the same against the flange 58. A flexible ring 66 disposed in a recess 67 in the nut 64 forms a fluid-tight connection between said nut and the boss 15. The nut 64 has a passageway 91 extending through the same and is formed with threads 68 to receive a pipe or other fitting which may be screwed into the same and which is in communication with the passageway 91. Passageway 91 when the valve head is in open position is in communication with the passageway 16 and thus in communication with the chamber 11. A screw driver slot 69 in the end of the valve head 54 facilitates tightening the nut 47 which is preferably of the friction type.

Extending upwardly from the disc 29 of valve operating member 27 is a boss 70. This boss and the said disc as well as the part 34 are formed with a bore 71 which communicates with the chamber 33. In this bore is mounted a piston 72. This piston is held from axial movement by means of a screw 73. The screw 73 has a collar 74 on it which butts up against the inner surface of the top 22 of cover 21 and restrains outward longitudinal movement of said screw. The piston 72 has a head 75 which engages the end of the screw 73. In this manner the piston 72 is held from endwise movement while the valve operating member 27 may move relative thereto. To form a fluid-tight joint between the piston 72 and the bore 71 a flexible ring 76 is employed. This ring fits within a groove 77 in the piston 72. The said ring in addition to forming a tight connection between the piston and cylinder also provides sufficient friction to reduce the tendency of the device to vibrate or oscillate.

The pressure regulating valve utilizes a heavy compression spring 78 which is disposed within the interior 79 of the cover 21. This spring is seated at one end against the disc 29 of the valve operating member 26 and at its other end against a disc 80 disposed within the interior 79. This disc has a boss 81 which is threaded to screw upon threads of the screw 73. The disc 80, as best shown in Fig. 2, has lugs 82 formed on the same and which are received in keyways 83 formed in the cover proper. This prevents rotation of the disc. The screw 73 has a shank 84 which is rotatable in a bearing 85 formed in a boss 86 issuing upwardly from the top 22 of cover 21. The shank 84 has a screw driver slot 87 by means of which the screw 73 may be rotated.

The parts of the invention when the pressure regulating valve is in use and when no fluid is being drawn are as shown in the drawings. In such case the pressure in chamber 11 offsets the pressure of spring 78 and holds the valve head 54 seated against seat 55. When the pressure regulating valve is not in use the disc 30 is forced against a shoulder 88 formed in the body 10. This takes the pressure off from the diaphragm 24 and prevents injury to said diaphragm. In use when the pressure within the chamber 11 drops the required amount, spring 78 forces the diaphragm 24 downwardly and opens the valve mechanism 89. This allows fluid to pass between valve head 54 and the seat 55 and into the chamber 11. At the same time fluid under pressure is directed into the chamber 33. In this chamber the pressure in one direction is exerted against the piston 72 which is fixed and in the opposite direction against the nut 47 tending to urge said nut and the valve stem 42 downwardly. At the same time pressure in the passageway 63 acts on the valve head 54 and urges the valve head 54 upwardly. The diameter of the bore 71 is the same as the diameter of the portion of the seat 55 engaged by the valve head 54. In this manner the effective area of the piston is equal to the area of contact of the valve head 54 with valve seat 55 and the two pressures neutralize each other and are balanced out and the valve head 54 floats. The opening and closing of the valve mechanism 89 is hence controlled solely by the diaphragm 24. By the arrangement of the ball 40 and the socket formed in the wall 37 of the valve member 28 the valve head 54 may swing from side to side and adjust itself with reference to the valve seat 55. In this manner perfect closing of the valve mechanism 89 is procured and without strain on the supporting parts for the valve head.

The advantages of the invention are manifest. The device is highly efficient and eliminates the usual difficulties encountered with pressure regulating valves. With the invention leakage at all points is prevented. Friction between the ring and the piston procures sufficient drag to prevent the device from oscillating or vibrating as would otherwise be the result. Since the pressure on the valve head is compensated for by the pressure in the chamber communicating with the valve operating device and cylinder, the valve head virtually floats and is responsive only to variations in pressure in the valve chamber. In this manner fluctuation in the pressure in the inlet are not transmitted to the valve head and far more accurate control is procured than would otherwise be possible. It will be noted that the sealing rings used with the invention prevent leakage at any point with respect to the various parts of the same. By means of the aligning mechanism the valve head can be made to adjust itself to the seat and to effect positive closing regardless of the angularity of the valve operating member of the invention occasioned through spring pressure being exerted on one side of the rim of the valve operating valve in excess of the pressure exerted on another side thereof.

Changes in the specific form of my invention, as herein described, may be made within the scope of what is claimed without departing from the spirit of my invention.

Having described my invention, what I claim as new and desire to protect by Letters Patent is:

1. In a pressure regulating valve, a body having a valve chamber and an inlet and an outlet communicating therewith, a valve seat having an opening therethrough communicating with said chamber and inlet, a diaphragm mounted in said body and having fluid communication with said outlet, a valve operating member carried by said diaphragm and movable toward and from said valve seat upon flexing of the diaphragm, resilient means for urging said valve operating member toward said valve seat, a valve stem extending through said valve seat, and attached to said valve operating member, a valve head carried thereby and engageable with said valve seat, means forming an expansible chamber associated with the valve operating member and operated thereby and including two relatively movable parts for producing the expansion, said parts having an effective area equal substantially to the area of said valve seat at the locality of contact with the valve head and serving to balance the inlet pressure acting on the valve head, said expansible chamber enlarging upon movement of the valve operating member toward the valve seat and means forming a passageway for bringing said expansible chamber into communication with said inlet.

2. In a pressure regulating valve, a body having a valve chamber and an inlet and an outlet communicating therewith, a valve seat having an opening therethrough communicating with said chamber and inlet, a diaphragm mounted in said body and having fluid communication with said outlet, a valve operating member carried by said diaphragm and movable toward and from said valve seat upon flexing of the diaphragm, resilient means for urging said valve operating member toward said valve seat, a valve stem extending through said valve seat and attached to said valve operating member, a valve head carried by said valve stem and engageable with said valve seat, a cylinder formed in said valve operating member extending in the same direction as said valve stem, a piston in said cylinder, an abutment for restraining movement of said piston in one direction relative to said body, and means for bringing said cylinder into communication with said inlet to subject the piston to inlet pressure and urge it toward said abutment, said cylinder being of substantially the same diameter as the diameter of said valve seat at the locality of contact with said valve head to balance the inlet pressure acting on the valve head.

3. In a pressure regulating valve, a body having a valve chamber and an inlet and an outlet communicating therewith, a valve seat having an opening therethrough communicating with said chamber and inlet, a diaphragm mounted in said body and having fluid communication with said outlet, a valve operating member carried by said diaphragm and movable toward and from said valve seat upon flexing of the diaphragm, resilient means for urging said valve operating member toward said valve seat, a valve stem extending through said valve seat, and attached to said valve operating member, a valve head carried by said valve stem and engageable with said valve seat means forming an expansible chamber associated with the valve operating member and operated thereby and including a part restrained from movement relative to said body and a part movable relative to said body and movable with said operating member, said expansible chamber enlarging upon movement of the valve operating device toward the valve seat, said parts having an effective area equal substantially to the area of said valve seat at the locality of contact with the valve head, said valve stem having a passageway therein communicating with said expansible chamber and said inlet and producing a pressure within said operating member offsetting the pressure on said valve head.

4. In a pressure regulating valve, a body having a valve chamber and an inlet and an outlet communicating therewith, a circular valve seat having an opening therethrough communicating with said chamber and inlet, a diaphragm mounted in said body and having fluid communicating with said outlet, a valve operating member carried by said diaphragm and movable toward and from said valve seat upon flexing of the diaphragm, resilient means for urging said valve operating member toward said valve seat, a valve stem extending through said valve seat and attached to said valve operating member, a valve head carried by said valve stem and engageable with said valve seat, a cylinder formed in said valve operating member extending in the same direction as said valve stem, a piston in said cylinder, means for holding said piston from axial movement relative to said body, means for bringing said cylinder into communication with said inlet, said cylinder being of substantially the same diameter as the diameter of said valve seat at the locality of contact with said valve head.

5. In a pressure regulating valve, a body having a valve chamber and an inlet and an outlet communicating therewith, a valve seat having an opening therethrough communicating with said chamber and inlet, a diaphragm mounted in said body and having fluid communication with said outlet, a valve operating member carried by said diaphragm and movable toward and from said valve seat upon flexing of the diaphragm, resilient means for urging said valve operating member toward said valve seat, a valve stem extending through said valve seat and attached to said valve operating member, a valve head carried by said valve stem and engageable with said valve seat, a cylinder formed in said valve operating member extending in the same direction as said valve stem, a piston in said cylinder, an abutment for restraining movement of said piston in one direction relative to said body, said valve stem having a passageway therein communicating with said cylinder and said inlet, said cylinder being of substantially the same diameter as the diameter of said valve seat at the locality of contact with said valve head and serving to balance the inlet pressure acting on the valve head.

6. In a pressure regulating valve, a body having a valve chamber and an inlet and an outlet communicating therewith, a valve seat having an opening therethrough communicating with said chamber and inlet, a diaphragm mounted in said body and having fluid communication with said outlet, a valve operating member carried by said diaphragm and movable toward and from said valve seat upon flexing of the diaphragm, resilient means for urging said valve operating member toward said valve seat, a valve stem extending through said valve seat, a valve head mounted on said valve stem and engageable with said valve seat upon movement toward said diaphragm, said operating member having at its lower end a wall formed with inner and outer concentric spherical surfaces, said inner surface providing a socket within said operating member, said wall having a central opening through which said valve stem extends, a ball slidably mounted on said valve stem and disposed within said socket, a washer fixed relative to said valve stem and having a surface engaging the outer spherical surface of said operating device and means within said operating member carried by said valve stem and resisting movement of said ball away from said inner surface of the wall of the operating member.

7. In a pressure regulating valve, a body having a valve chamber and an inlet and an outlet communicating therewith, a valve seat having an opening therethrough communicating with said chamber and inlet, a diaphragm mounted in said body and having fluid communication with said outlet, a valve operating member carried by said diaphragm and movable toward and from said valve seat upon flexing of the diaphragm, resilient means for urging said valve operating member toward said valve seat, a valve stem extending through said valve seat, a valve head mounted on said valve stem and engageable with said valve seat upon movement toward said diaphragm, said operating member having at its lower end a wall formed with inner and outer concentric spherical surfaces, said inner surface providing a socket within said operating member, said wall having a central opening through which said valve stem extends, a ball slidably mounted on said valve stem and disposed within said socket, a washer fixed relative to said valve stem and having a surface engaging the outer spherical surface of said operating device and a nut screwed on the end of said valve stem and resisting movement of said ball away from said inner surface.

8. In a pressure regulating valve, a body having a valve chamber and an inlet and an outlet communicating therewith, a valve seat having an opening therethrough communicating with said chamber and inlet, a diaphragm mounted in said body and having fluid communication with said outlet, a valve operating member carried by said diaphragm and movable toward and from said valve seat upon flexing of the diaphragm, resilient means for urging said valve operating member toward said valve seat, a valve stem extending through said valve seat and attached to said valve operating member, a valve head carried by said valve stem and engageable with said valve seat, over an area having an outer line of contact, means forming an expansible chamber associated with the valve operating member and operated thereby and including a part restrained from movement relative to said body and a part movable relative to said body and movable with said operating member, means forming a passageway bringing said expansible chamber into communication with the inlet the area of said restrained part being substantially equal to the area of the geometric figure bounded by the outer line of contact of said valve head with said valve seat.

NELSON F. CORNELIUS.

References Cited in the file of this patent

UNITED STATES PATENTS

| Number | Name | Date |
|---|---|---|
| 1,897,061 | Lapp | Feb. 14, 1933 |
| 1,954,930 | Greenlee | Apr. 17, 1934 |

FOREIGN PATENTS

| Number | Country | Date |
|---|---|---|
| 749,705 | France | of 1933 |